US012773696B2

(12) United States Patent
Mccullough et al.

(10) Patent No.: US 12,773,696 B2
(45) Date of Patent: Oct. 27, 2026

(54) RETENTION LID FOR STABILIZING POROUS MEMBRANE INSERTS DURING MANIPULATION

(71) Applicant: U.S. ENVIRONMENTAL PROTECTION AGENCY, Washington, DC (US)

(72) Inventors: Shaun David Mccullough, Pittsboro, NC (US); Earl Puckett, Durham, NC (US)

(73) Assignee: Shaun McCullough, Chesapeake, VA (US)

( * ) Notice: Subject to any disclaimer, the term of this patent is extended or adjusted under 35 U.S.C. 154(b) by 1031 days.

(21) Appl. No.: 17/888,153

(22) Filed: Aug. 15, 2022

(65) Prior Publication Data

US 2024/0050953 A1 Feb. 15, 2024

(51) Int. Cl.
*B01L 3/00* (2006.01)

(52) U.S. Cl.
CPC ..... *B01L 3/50853* (2013.01); *B01L 2200/027* (2013.01); *B01L 2200/14* (2013.01); *B01L 2300/0681* (2013.01); *B01L 2300/0829* (2013.01)

(58) Field of Classification Search
CPC ........... B01L 3/50853; B01L 2200/027; B01L 2200/14; B01L 2300/0681; B01L 2300/0829; C12M 23/38; C12M 25/04; C12M 23/12
See application file for complete search history.

(56) References Cited

U.S. PATENT DOCUMENTS

| | | | |
|---|---|---|---|
| 3,356,462 A | 12/1967 | Cooke et al. | |
| D246,466 S | 11/1977 | Attree et al. | |
| 4,657,867 A | 4/1987 | Guhl et al. | |
| D338,965 S | 8/1993 | Glanz et al. | |
| 5,652,142 A | 7/1997 | Barker et al. | |
| 5,780,294 A | 7/1998 | Stevens et al. | |
| 5,801,055 A * | 9/1998 | Henderson | B01L 3/50255 435/297.5 |
| 5,863,792 A | 1/1999 | Tyndorf et al. | |
| D411,308 S | 6/1999 | Pandey et al. | |
| D420,743 S | 2/2000 | Monks | |
| D469,544 S | 1/2003 | Lafond et al. | |
| 9,494,577 B2 | 11/2016 | Mcgarr et al. | |
| 2020/0354668 A1 | 11/2020 | Sawyer et al. | |
| 2020/0370266 A1 * | 11/2020 | Millman | E02D 17/10 |
| 2023/0166260 A1 * | 6/2023 | Huth | B01L 3/50255 422/552 |

OTHER PUBLICATIONS

"Thermo Scientific Microplates Guide", pp. 1-64 (Thermo Fisher Scientific Inc., 2014).
International Search Report for PCT/US2023/024947 dated Aug. 29, 2023.

* cited by examiner

*Primary Examiner* — Lyle Alexander
*Assistant Examiner* — Alison Claire Gerhard
(74) *Attorney, Agent, or Firm* — Caesar Rivise, PC

(57) ABSTRACT

A lid and a method of testing a test substance in a porous membrane insert (PMI) are dis closed, the lid including a body, sidewalls positioned along an outer perimeter of the body and configured to be seated on a shoulder of a multi-well cell culture plate, and at least one hole through the body and/or at least one knockout, wherein the lid is configured to provide the at least one hole over a corresponding well of the multi-well cell culture plate which contains the porous membrane insert. The method is a method of testing a test substance in a PMI, the method includes the steps of providing a multi-well plate with PMIs, providing the lid, removing the cover from the multi-well plate, adding the test substance, placing the lid on the multi-well cell culture plate, and conducting a manipulation of the test substance.

7 Claims, 4 Drawing Sheets

RETENTION LID FOR STABILIZING POROUS MEMBRANE INSERTS DURING MANIPULATION

STATEMENT REGARDING FEDERALLY SPONSORED RESEARCH OR DEVELOPMENT

The United States government has certain rights in the invention because employees of the United States Environmental Protection Agency are co-inventors, and the invention was supported by general EPA research funds.

BACKGROUND OF THE INVENTION

1. Field of Invention

This invention relates to multi-well cell culture plates, and particularly to the use of porous membrane inserts in multi-well cell culture plates.

2. Description of Related Art

A porous membrane insert (PMI) is an insert that is placed within the well of a multi-well cell culture plate to separate the well into two compartments by a porous membrane. A PMI (also known as a "cell culture insert") functions as a substrate for the growth of cell cultures of various configurations for a range of biomedical research/testing applications (e.g., toxicology, cancer biology, neuroscience, infectious diseases, etc.).

Most recently, PMIs have been heavily used for research to further the understanding of the biology underlying the effects of SARS-CoV2/COVID-19 on the respiratory tract, characterizing respiratory tract biology, testing the toxicity of inhaled agents, and to explore pharmaceutical interventions. PMIS are also commonly used in the construction of cell culture-based models of the respiratory tract, eye, and skin where the establishment of "air-liquid interface (ALI)" conditions, where cells representing aspects of these tissues are grown on the surface of the porous membrane and the growth medium is removed from the compartment within the insert to create an environment that recapitulates the conditions that these tissues experience in vivo.

The use of PMIS for biomedical research and testing requires that they be manipulated for maintenance as well as experimental treatment and measurement of experimental outcomes of cell cultures. PMIs, especially those in smaller formats (i.e., for use with multi-well cell culture plates having 12 or more wells), often shift/move unexpectedly within their wells during these manipulations. These shifts can result in accidental damage to the cell culture caused by instruments commonly used in manipulations (e.g., pipettes and aspiration tips), spilling of biohazardous liquids, contamination of cell cultures, overflow of liquid from the insert into the well below, inconsistent measurement of experimental outcomes, and/or other types of disruption to the cell culture system. Any of these adverse outcomes would minimally result in confounding effects on the data collected and would likely result in the disqualification/removal of affected PMIS from experiments. In some cases, the loss of a single PMI cell culture can limit the utility of an experiment and/or result in the need to repeat an experiment. These occurrences can incur significant costs and prolong the duration of research studies. They can also cause false positive or negative conclusions in the evaluation of inhaled material toxicity or pharmaceutical efficacy. Further, some of these outcomes can result in health risks to researchers when PMIS are used in combination with potentially infectious materials and/or hazardous chemicals.

Accordingly, it is desired to provide a device and method for stabilizing a PMI within a well of a multi-well culture plate. It is further desired to provide such a device and method which do not obstruct access to the contents of the PMI. It is still further desired to provide such a device and method which work with commercially available multi-well culture plates of a variety of sizes and well patterns.

All references cited herein are incorporated herein by reference in their entireties.

BRIEF SUMMARY OF THE INVENTION

Accordingly, a first aspect of the invention is a lid for stabilizing a porous membrane insert in a multi-well cell culture plate, said lid comprising a body which is planar and configured to span a top surface of the multi-well cell culture plate, sidewalls positioned along an outer perimeter of the body and configured to be seated on a shoulder of the multi-well cell culture plate, and at least one hole through the body and/or at least one knockout configured to be removed to provide the at least one hole through the body, wherein the lid is configured to provide the at least one hole over a corresponding well of the multi-well cell culture plate which contains the porous membrane insert, the at least one hole has a diameter greater than or equal to an outer diameter of the corresponding well and less than a diameter of a rim of the porous membrane insert such that the lid retains the porous membrane insert in the corresponding well while permitting unobstructed access to contents of the porous membrane insert.

In certain embodiments, the lid comprises a metal.

In certain embodiments, the lid comprises a plastic.

In certain embodiments, the lid has rounded or straight corners to accommodate various multi-well cell culture plate designs.

In certain embodiments, the lid comprises 4, 6, 12, 24, 48 or 96 holes through the body.

In certain embodiments, the lid comprises 4, 6, 12, 24, 48 or 96 knockouts through the body, wherein each of the knockouts comprises a circular portion of the body defined by perforations which enable removal of the circular portion of the body to selectively provide the at least one hole through the body.

In certain embodiments, the lid is effective to stabilize analytical instrumentation to reduce technical variability in experimental measurements.

A second aspect of the invention is a method of testing a test substance in a porous membrane insert comprising providing a multi-well cell culture plate comprising at least one porous membrane insert and a multi-well plate cover free of holes, providing the inventive lid, removing the multi-well plate cover from the multi-well cell culture plate, adding the test substance to the at least one porous membrane insert in at least one well of the multi-well plate, placing the lid on a top surface of the multi-well cell culture plate to stabilize the at least one porous membrane insert, and conducting a manipulation of the test substance in the porous membrane insert by accessing the test substance through the at least one hole of the lid.

In certain embodiments, the method further comprises the step of placing the multi-well plate cover on a top portion of the lid to prevent contamination.

In certain embodiments of the method, the conducting step comprises using analytical instrumentation to acquire a measurement of the test substance, wherein the lid is effective to reduce technical variability in the measurement.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF PREFERRED EMBODIMENTS OF THE INVENTION

The use of the inventive lid prevents the unintentional shifting/movement of a PMI during manipulations and thereby reduces the occurrence of any of the resulting adverse outcomes discussed above, thus improving experimental cost/time efficiency, data quality and integrity, and researcher safety. Further, preferred embodiments of the lid are configured to be compatible with commercially available PMIS and multi-well cell culture plates. It is also within the scope of the invention to provide a lid configured for use with multi-well cell culture plates yet to be developed or marketed.

Figure 1:
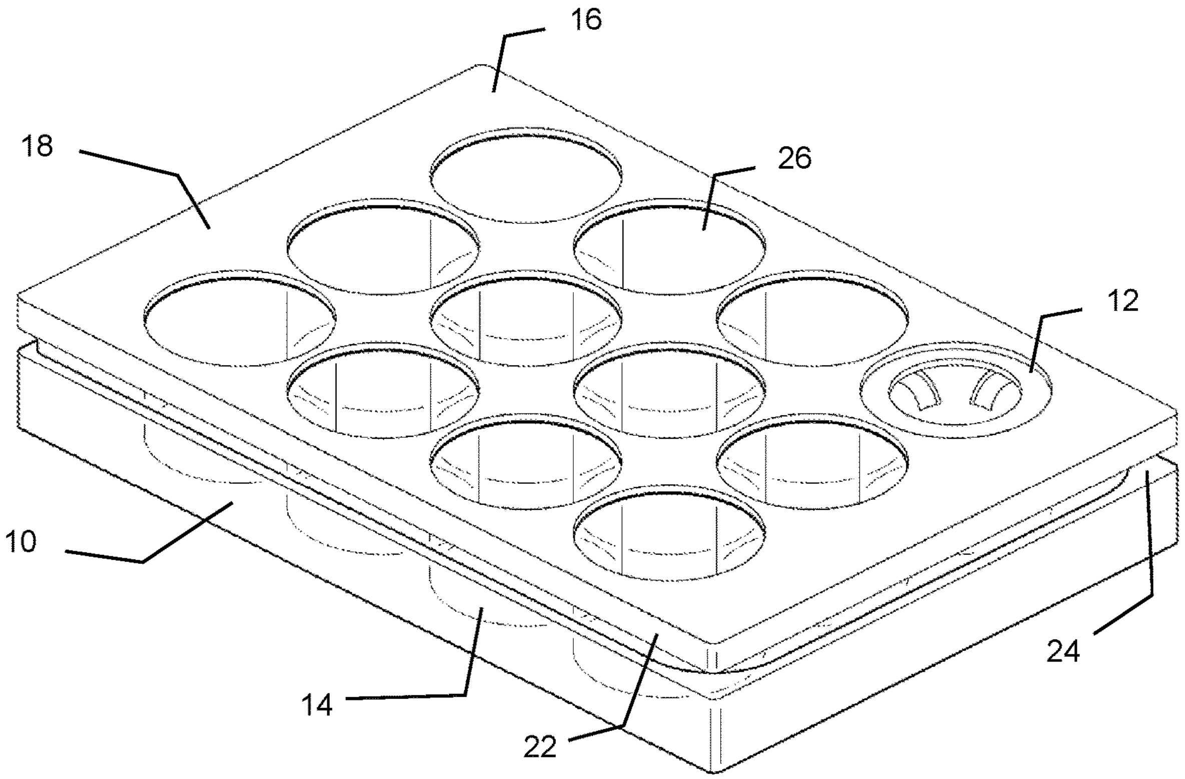
FIG. 1 is a perspective view of an embodiment of the lid of the invention placed on a multi-well cell culture plate containing a porous membrane insert.
Figure 2:
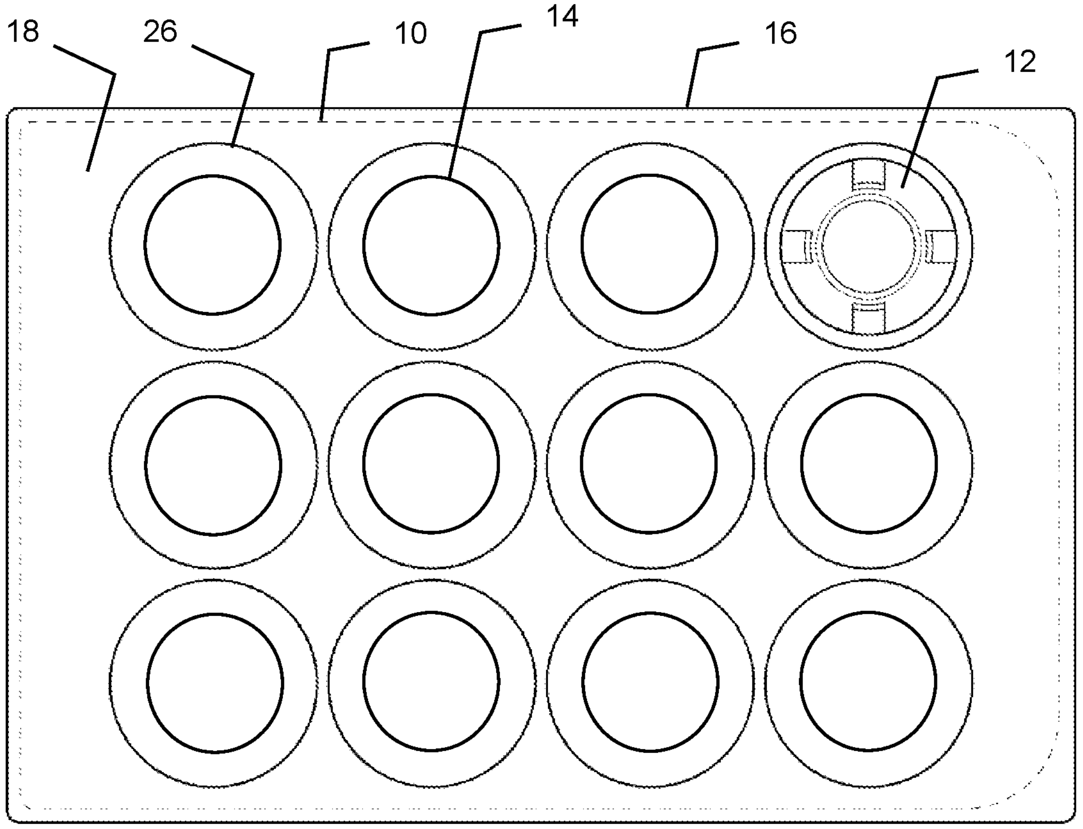
FIG. 2 is a top view of the embodiment of FIG. 1.
Figure 3:
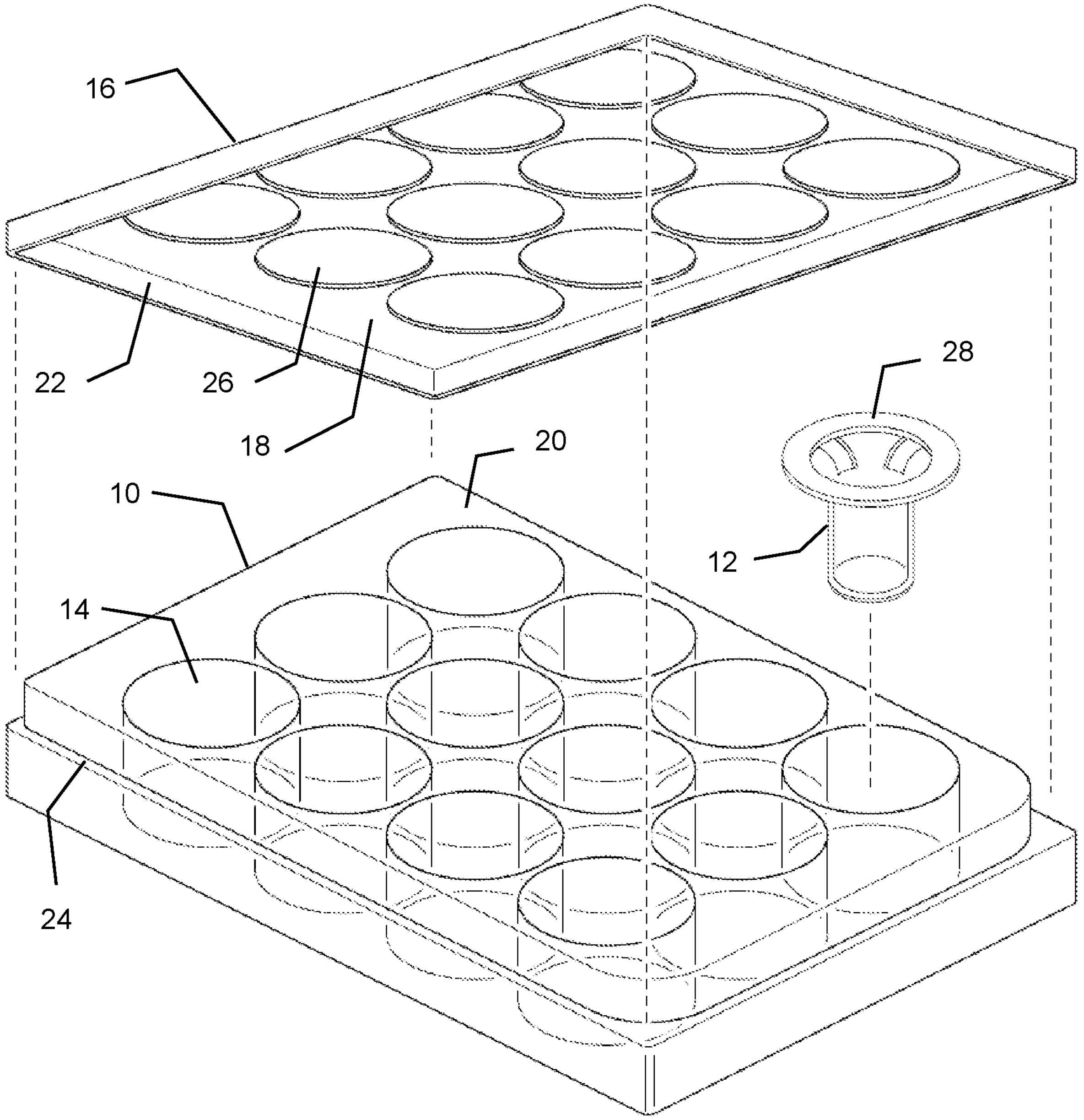
FIG. 3 is an exploded view of the embodiment of FIG. 1.
Figure 4A:
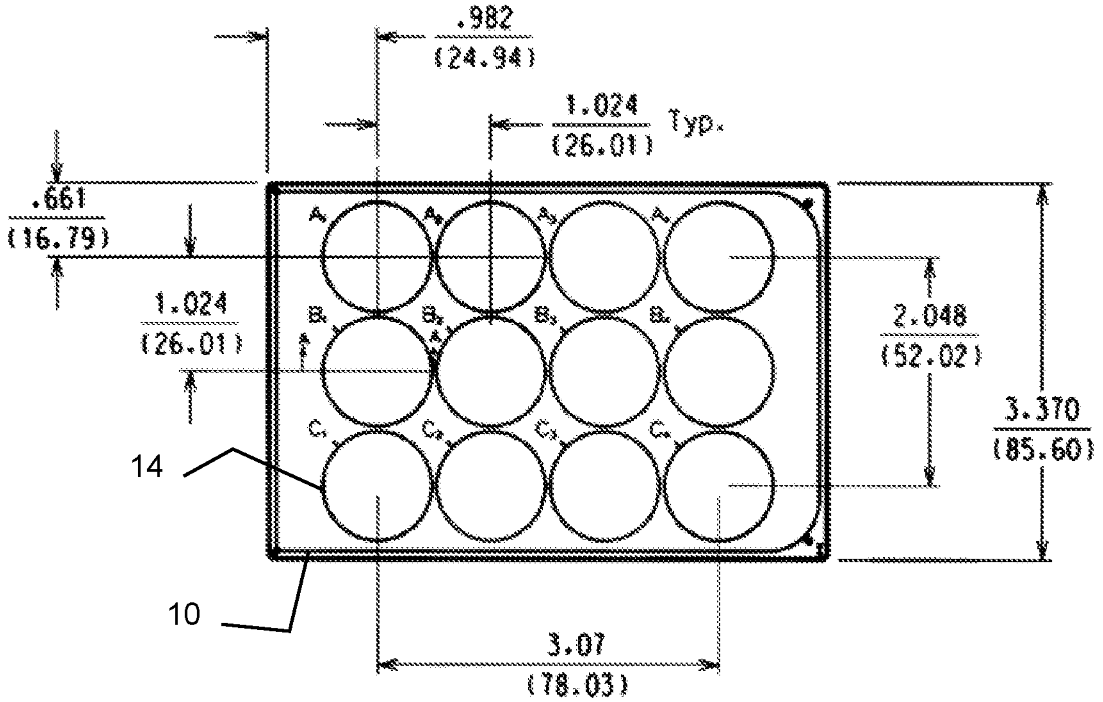
FIG. 4A (PRIOR ART)
FIG. 4A is a top view of a 12-cell multi-well cell culture plate manufactured by Corning.
Figure 4B:
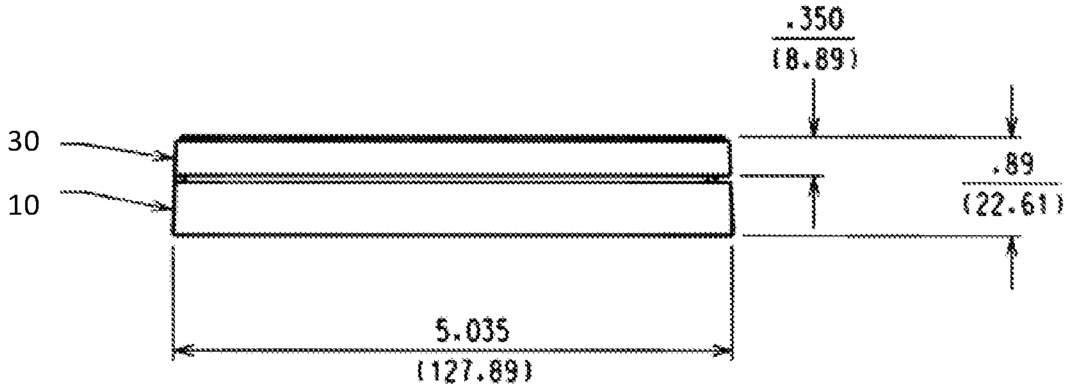
FIG. 4B (PRIOR ART)
FIG. 4B is a side view of the 12-cell multi-well cell culture plate of FIG. 4A.

Referring to FIGS. 1, 2, 3, 4A and 4B, when conducting research using multi-well cell culture plate 10 and PMI 12, PMI 12 hangs from the top of well 14 to suspend the porous membrane of PMI 12 above the bottom of well 14 of cell culture plate 10 and is held in place by cover 30 of the multi-well cell culture plate 10. However, cover 30 is solid and must be removed prior to the manipulation of PMI-based cell cultures, which is frequently required during studies for routine culture maintenance, experimental treatment, and/or sample collection. Many of the manipulations involved in maintenance and/or experimental treatment/sample collection require tilting the entire multi-well cell culture plate at an angle while adding or removing materials. Tilting the multi-well cell culture plate can result in the PMI shifting/moving in their wells, which is exacerbated by contact with instruments used for the addition and/or removal of materials (e.g., culture medium, experimental treatments, etc.). The movement of PMI 12 during manipulations is more common in the formats designed to fit multi-well plates having twelve or more wells.

Lid 16 comprises body 18 which is planar and configured to span top surface 20 of multi-well cell culture plate 10. Sidewalls 22 of lid 16 are positioned along an outer perimeter of body 18 and are configured to be seated on shoulder 24 of multi-well cell culture plate 10. Lid 16 of FIGS. 1-3 comprises twelve holes 26 corresponding to the twelve wells 14 of plate 10. Lid 16 is configured to provide holes 26 over corresponding wells 14 of plate 10, including the well containing PMI 12. Each of holes 26 has a diameter greater than or equal to an outer diameter of the corresponding well and less than an outer diameter of rim 28 of PMI 12, such that lid 16 retains PMI 12 in well 14 while permitting unobstructed access to contents of PMI 12. Preferably, the diameter of hole 26 is very close, or equal to, the diameter of the corresponding well 14 such the two diameters differ less than shown in FIG. 2.

An advantageous feature of the invention described here prevents PMIS from shifting in multi-well cell culture plates while also allowing access to the PMIS and their respective wells for commonly used manipulations, including changing cell culture medium, washing cells, and/or adding experimental treatments and measurements. This invention also increases the speed at which manipulations are conducted. The prevention of movement of the PMIS reduces the loss of the test substance thereby increasing the efficiency of the manipulation. The invention described herein promotes consistency and reproducibility.

Another benefit of this invention includes the reduction of potential contamination of the cell culture. Additionally, most cell cultures used with this invention are biosafety level 2 or 3 which can be very hazardous to the users. The use of this invention during testing increases the safety of the user conducting the test by reducing the chance of movement or spillage of the test substance. Many test substances used with the invention are known to be very hazardous to the users. Additionally, this invention would be used in the identification of hazards posed by uncharacterized test substances that could be very hazardous to users.

Lid 16 can be sized to accommodate multi-well cell culture plates of various sizes and configurations. For example, suitable multi-well cell culture plates for use with the lid of the invention can be obtained from many suppliers, including but not limited to Corning (e.g., Catalog Nos. 3506, 3512, 3527, 3736, 3737, 3738 and 3548), TPP (Catalog Nos. TP92406, TP92412 and TP92424), Greiner (Catalog Nos. 657160, 657110, 665180, 665110 and 662160), Falcon (e.g., Catalog Nos. 353934, 353225, 353935, 351146, 351143, 351147 and 351178), NUNC (e.g., Catalog Nos. 179820, 150239, 150200, 144530, 150787, 269787, 267061 and 267062), Celltreat, CellQart, and Nest. The sizes and shapes of the multi-well cell culture plates may differ based on the manufacturer, but the lid of the invention can be configured to fit. As an example, Corning's 12-well multi-well plate has the dimensions shown in FIGS. 4A and 4B. Additional examples of multi-well plates suitable for use with the lid of the invention are disclosed in, e.g., U.S. Pat. No. 3,356,462, D246466, D338965, D411308, D420743 and D469544 and in “Thermo Scientific Microplates Guide”, pp. 1-64 (Thermo Fisher Scientific Inc., 2014).

Likewise, suitable PMIS for use with the lid of the invention can be obtained from many suppliers, including but not limited to Corning (e.g., Catalog Nos. 3450, 3460 and 3470), PRIMA (Catalog Nos. 667607 and 667635), Greiner (Catalog Nos. 657641, 665641 and 662641), Falcon (e.g., Catalog Nos. 353090, 353180 and 353095), NUNC, Celltreat, CellQart, and Nest.

The lid comprises at least one hole therethrough. The hole can be provided through the lid as supplied from the manufacturer, and/or can be selected by the user by removing (i.e., punching out or knocking out) a knockout to allow the user to provide the desired number of holes through the body.

In certain embodiments, the lid is reusable and comprises a metal material such as stainless steel, aluminum, or other suitable material that can be cleaned by a broad range of typical laboratory ware cleaning products and autoclaved to provide for easy sterilization between uses. The material used in this embodiment is preferably resistant to oxidation and damage (e.g., material integrity and dimensional stability) by commonly used sanitizing agents (e.g., detergents, bleach, and alcohols), UV light, and autoclaving conditions.

In an alternate embodiment, the lid is disposable and made from plastic materials such as polystyrene or other suitable materials. The lid could be used as either a single-use version of the reusable form or installed as an integral component of the multi-well cell culture plate and cover system. The dimensions, opening diameters, and spacing of openings can be configured to accommodate PMIS and multi-well cell culture plates made by different manufacturers. In this embodiment, the disposable lid optionally includes a small ridge or shoulder on the top surface which allows for the secure placement of the multi-well plate cover over the lid such that it protects the cell cultures from contamination while also allowing gas/environment exchange in a manner that is analogous to the function of the multi-well plate cover in its native application.

In certain embodiments, the shape of the lid can be adjusted, such as the corners being either rounded or straight, to accommodate the various multi-well cell culture plate designs of different manufacturers.

In an alternative embodiment, the lid does not include holes for each well. For example, the lid might be made of an opaque material and only have openings for 12 of 24 wells. This would be ideal for imaging of fluorescent dyes. Ambient light can reduce fluorescent signals, so reducing the number of holes in the lid, reduces the exposure to light.

In certain embodiments, the lid comprises 4, 6, 12, 24, 48 or 96 holes through the body. In an alternative embodiment, the lid comprises 4, 6, 12, 24, 48 or 96 knockouts wherein each of the knockouts comprises a circular portion of the body defined by perforations which enable relatively easy removal of the circular portion of the body to selectively provide the at least one hole through the body. The knockouts allow a user to decide how many holes the user would like to utilize for his or her particular experiment.

A second aspect of the invention includes a method of testing a test substance in a porous membrane insert which includes the steps of providing a multi-well cell culture plate comprising at least one porous membrane insert and a multi-well plate cover free, providing the lid, removing the multi-well plate cover from the multi-well cell culture plate, adding the test substance to the at least one porous membrane insert in at least one well of the multi-well plate, placing the lid on a top surface of the multi-well cell culture plate to stabilize the at least one porous membrane insert, and conducting a manipulation of the test substance in the porous membrane insert by accessing the test substance through the at least one hole of the lid.

In certain embodiments, the lid is used only during PMI manipulations, then removed prior to the replacement of the standard multi-well plate cover for normal culture. However, the standard multi-well plate cover can be used in conjunction with the disposable embodiment. The disposable lid embodiment preferably includes a small ridge or shoulder on the top surface to allow the placement of the standard multi-well plate cover on the disposable lid.

In certain embodiments, the method further comprises the step of placing the multi-well plate cover on a top portion of the lid to prevent contamination.

While the invention has been described in detail and with reference to specific examples thereof, it will be apparent to one skilled in the art that various changes and modifications can be made therein without departing from the spirit and scope thereof.

REFERENCE NUMBERS

10 Multi-well cell culture plate
12 Porous membrane insert (PMI)
14 Well
16 Lid
18 Body
20 Top Surface
22 Sidewalls
24 Shoulder
26 Holes
28 Rim
30 Cover

What is claimed is:

1. A lid for stabilizing a porous membrane insert in a multi-well cell culture plate, said lid comprising:

a body which is planar and configured to span a top surface of the multi-well cell culture plate;

sidewalls positioned along an outer perimeter of the body and configured to be seated on a shoulder of the multi-well cell culture plate; and at least one hole through the body and/or at least one knockout configured to be removed to provide the at least one hole through the body, wherein the lid is configured to provide the at least one hole over a corresponding well of the multi-well cell culture plate, the corresponding well contains the porous membrane insert, the at least one hole has a diameter greater than an outer diameter of the corresponding well and less than a diameter of a rim of the porous membrane insert such that the lid stabilizes and retains the porous membrane insert in the corresponding well while permitting unobstructed access to contents of the porous membrane insert.

2. The lid of claim 1, wherein the lid comprises a metal.

3. The lid of claim 1, wherein the lid comprises a plastic.

4. The lid of claim 1, wherein the lid has rounded or straight corners to accommodate various multi-well cell culture plate designs.

5. The lid of claim 1, which comprises 4, 6, 12, 24, 48 or 96 holes through the body.

6. The lid of claim 1, which comprises 4, 6, 12, 24, 48 or 96 knockouts through the body, wherein each of the knockouts comprises a circular portion of the body defined by perforations which enable removal of the circular portion of the body to selectively provide the at least one hole through the body.

7. The lid of claim 1, which is effective to stabilize the porous membrane insert such that the lid is configured to reduce technical variability in experimental measurements when used with analytical instrumentation.

* * * * *